(12) United States Patent
Durand et al.

(10) Patent No.: US 10,909,043 B2
(45) Date of Patent: Feb. 2, 2021

(54) DIRECT MEMORY ACCESS (DMA) CONTROLLER, DEVICE AND METHOD USING A WRITE CONTROL MODULE FOR REORGANIZATION OF STORAGE ADDRESSES IN A SHARED LOCAL ADDRESS SPACE

(71) Applicant: Commissariat a l'energie atomique et aux energies alternatives, Paris (FR)

(72) Inventors: Yves Durand, Saint-Ismier (FR); Christian Bernard, Saint Etienne de Crossey (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 24 days.

(21) Appl. No.: 16/116,050

(22) Filed: Aug. 29, 2018

(65) Prior Publication Data
US 2019/0065402 A1    Feb. 28, 2019

(30) Foreign Application Priority Data

Aug. 30, 2017 (FR) ...................................... 17 57998

(51) Int. Cl.
| | | |
|---|---|---|
| *G06F 12/10* | (2016.01) | |
| *G06F 13/28* | (2006.01) | |
| *G06F 12/1081* | (2016.01) | |

(52) U.S. Cl.
CPC ........ *G06F 12/1081* (2013.01); *G06F 13/28* (2013.01); *G06F 2212/621* (2013.01); *G06F 2213/0038* (2013.01); *G06F 2213/28* (2013.01)

(58) Field of Classification Search
CPC .. G06F 12/1081; G06F 13/28; G06F 13/1668; G06F 13/1663; G06F 2212/621; G06F 2213/0038; G06F 2213/28
See application file for complete search history.

(56) References Cited

U.S. PATENT DOCUMENTS 5,717,952 A * 2/1998 Christiansen .......... G06F 13/28
                                                      710/22
5,835,788 A    11/1998 Blumer et al.
(Continued)

FOREIGN PATENT DOCUMENTS

| EP | 1 619 590 A1 | 1/2006 |
| WO | WO 98/12630 | 3/1998 |

OTHER PUBLICATIONS

French Preliminary Search Report dated May 14, 2018 in French Application 17 57998 filed on Aug. 30, 2017 (with English Translation of Categories of cited documents), 3 pages.*

(Continued)

*Primary Examiner* — Glenn Gossage
(74) *Attorney, Agent, or Firm* — Oblon, McClelland, Maier & Neustadt, L.L.P.

(57) ABSTRACT

A direct memory access controller, configured to be used in a computing node of a system on chip (SoC), includes: (1) an input buffer for receiving packets of data coming from an input/output interface of the computing node; (2) a write control module for controlling writing of data extracted from each packet to a local memory of the computing node shared by at least one processor other than the direct memory access controller; and (3) an arithmetic logic unit for executing microprograms. The write control module is configured to control the execution by the arithmetic logic unit of at least one microprogram including instruction lines for arithmetic and/or logical calculation concerning only storage addresses for storing the data received by the input buffer for a reorganization of the data in the shared local memory. Optionally, at least one microprogram may be stored in a register, and at least two operating modes (e.g., restart mode and pause mode) of the at least one microprogram stored in the register may be configurable. Exemplary microprograms can (1) provide image processing parameters including sizes (Continued)

of columns of image blocks, (2) provide image processing parameters including numbers of successive pieces of data to be processed which are to be written to successive addresses in the shared local memory, and (3) utilize a sequential write mode and/or an absolute-offset write mode. Microprograms may be selected based on an identifier included in a header of each packet.

14 Claims, 4 Drawing Sheets

(56) References Cited

U.S. PATENT DOCUMENTS

| | | | | |
|---|---|---|---|---|
| 7,088,872 | B1* | 8/2006 | Hsieh | G06F 17/18 |
| | | | | 382/168 |
| 8,046,503 | B2* | 10/2011 | Couvert | G06F 13/28 |
| | | | | 710/22 |
| 2006/0026311 | A1 | 2/2006 | Nicolai et al. | |
| 2006/0168365 | A1* | 7/2006 | Martinez | G06F 12/1081 |
| | | | | 710/22 |
| 2008/0104341 | A1* | 5/2008 | Ihara | G06F 13/28 |
| | | | | 711/154 |
| 2010/0169673 | A1 | 7/2010 | Saripalli | |
| 2011/0087808 | A1* | 4/2011 | Durand | G06F 13/28 |
| | | | | 710/26 |
| 2012/0173772 | A1* | 7/2012 | Durand | G06F 13/28 |
| | | | | 710/22 |
| 2016/0028633 | A1* | 1/2016 | Durand | H04L 43/0882 |
| | | | | 370/236 |
| 2017/0111286 | A1* | 4/2017 | Kawamura | G06F 3/0659 |

OTHER PUBLICATIONS

Dupont De Dinechin, B., et al. "A Clustered Manycore Processor Architecture for Embedded and Accelerated Applications", 2013 IEEE High Performance Extreme Computing Conference (HPEC), 2013, 6 pages.

Martin, J., et al. "A Microprogrammable Memory Controller for High-Performance Dataflow Applications", 2009 Proceedings of ESSCIRC, 2009, 4 pages.

* cited by examiner

DIRECT MEMORY ACCESS (DMA) CONTROLLER, DEVICE AND METHOD USING A WRITE CONTROL MODULE FOR REORGANIZATION OF STORAGE ADDRESSES IN A SHARED LOCAL ADDRESS SPACE

The invention relates to a direct memory access controller to be placed in a computing node of a system on chip. It also relates to a data processing device of a network-on-chip in which each computing node includes such a direct memory access controller. It also relates to a data reception and storage method which can be implemented using such a direct memory access controller.

BACKGROUND OF THE INVENTION

Such a controller, termed a DMA (Direct Memory Access) controller, is generally used in a data processing device employing distributed processing requiring numerous data transfers between various computing nodes. The controller makes it possible to transfer data to be processed or already processed by a processor or accelerator of a computing node coming from or going to a peripheral, such as another computing node, a communication port, a hard drive, or any kind of memory. The transfer is made between the peripheral and a local memory placed as close as possible to the processor or accelerator in the computing node to which it belongs, without intervention by the processor or accelerator other than initiating and finishing the transfer. In this way, in a distributed architecture in which there are numerous data exchanges, for example in the application field of the Internet of Things (IoT), processors and accelerators dedicated to data processing are freed from transfers.

A DMA controller is, for example, very useful in a system in which repeated accesses to fast peripherals could otherwise freeze up or at least slow down the processing performed by the processor or accelerator close to which it is placed. The presence thereof optimizes the processing time of software applications executed by the processor or accelerator by allowing the DMA controller to manage data transfers to and from the local memory. It is generally used for data transmission, for a remote transfer from the local memory, but it can also be used for data reception, for data reception and transfer thereof to the local memory.

The invention applies more specifically to a direct memory access controller to be used in a computing node of a system on chip (SoC), used at least for data reception, comprising:
  an input buffer for receiving packets of data to be processed, coming from an input/output interface of the computing node,
  a module for controlling the writing of the data to be processed, extracted from each packet, in a local memory of the computing node, the local memory being shared by at least one processor for processing the data other than the direct memory access controller,
  an arithmetic logic unit for executing microprograms, and
  a storage register for storing at least one microprogram.

DESCRIPTION OF THE PRIOR ART

Such a DMA controller is described, for example, in the article by Martin et al. entitled "A microprogrammable memory controller for high-performance dataflow applications", published at the time of the ESSCIRC 2009 conference held in Athens (Greece) on Sep. 14-18, 2009. This DMA controller is primarily used for data transmission, such that it also comprises an output buffer memory for the transmission of processed data packets to the input/output interface of the computing node and a read control module in the local memory. Its arithmetic logic unit for executing microprograms is controlled by the read control module and is applied, in data transmission, to the reading of these data in the local memory. It also makes it possible to manage complex programmed movements of a work pointer, during reading and writing, in an additional buffer memory in the DMA controller, for reordering, if necessary, the data coming from the local memory before they are transmitted outside the computing node, so as to comply with a predefined sequence. In this way it is possible to organize the data for transmission as a function of the subsequent processing they are to undergo. But some processing is not capable of anticipating a reorganization of the data at the source, meaning that this must be done upon receipt. Consequently, when the case arises, the data received by a computing node must generally first be written to a first local address space and then reorganized in a second local address space, thus doubling the amount of address space required. Even by possibly transposing the teaching of the aforementioned Martin et al. document to reception by symmetry, the necessary use of an additional internal buffer memory in the DMA controller doubles the amount of storage space occupied in the data reception computing node.

A solution is suggested in the article by Dupont de Dinechin et al. entitled "A clustered manycore processor architecture for embedded and accelerated applications", published at the time of the HPEC 2013 conference held in Waltham, Mass. (USA) on Sep. 10-12, 2013. It would consist in adding explicit instructions as metadata for destination address jumps applicable at least to the initial data of each received packet. But for complex reorganizations, such a method is likely to lead to transmissions of excessively large quantities of metadata in addition to the actual data.

It may therefore be desirable to design a direct memory access controller which can overcome at least some of the aforementioned problems and limitations.

SUMMARY OF THE INVENTION

Consequently, a direct memory access controller to be placed in a computing node of a system on chip is proposed, comprising:
  an input buffer for receiving packets of data to be processed, coming from an input/output interface of the computing node,
  a module for controlling the writing of the data to be processed, extracted from each packet, in a local memory of the computing node, the local memory being shared by at least one processor for processing the data other than the direct memory access controller,
  an arithmetic logic unit for executing microprograms, and
  a storage register for storing at least one microprogram,
  wherein at least one microprogram is stored in the register, comprising instruction lines for arithmetic and/or logical calculation concerning only storage addresses for storing the data to be processed, received by the input buffer, for a reorganization of same in the shared local memory, with the write control module being designed to control the execution of the at least one microprogram by the arithmetic logic unit.

Consequently, by explicitly microprogramming the reorganization of the addresses of data being received, that is, as close as possible to the processing that needs to be applied to the processed data, for an execution of the reorganization by the arithmetic logic unit of the direct memory access controller controlled by its write control module, this reorganization occurs on the fly and directly in the shared local memory without data duplication. In other words, it can be done on the "transport" protocol level of the OSI (Open Systems Interconnection) standard communication model by working directly on the addresses of data without the need for Intermediate storage of the actual data. Bearing in mind that for a great deal of processing, such as the encoding of images by wavelet transformation requiring matrix transpositions for horizontal and vertical filtering, data reorganization can take up almost as much memory space and computing time as data processing, about a third of local memory space is thus saved and the computing time is cut in half.

As an option:
several microprograms are stored in the register and respectively associated with several corresponding identifiers,
the write control module is configured to select one of the microprograms for each received packet of data to be processed based on a correspondence between the identifier associated with the microprogram and an identifier included in a header of each packet of data to be processed.

Also as an option:
the at least one microprogram stored in the register comprises execution parameters to be defined,
the write control module is configured to define at least a portion of these execution parameters based on execution data included in a header of each packet of data to be processed.

Also as an option, the execution parameters to be defined comprise image processing parameters including at least one of the elements of the set consisting of:
size(s) of lines or columns of image blocks, and
number(s) of successive pieces of data to be processed, which are to be written to successive addresses in the shared local memory.

Also as an option, the write control module is designed to control the execution of several microprograms in parallel on several different execution channels, each of which identified by a channel identifier included in each packet of data to be processed, and to reserve several address subspaces associated with the execution channels, respectively, in the shared local memory.

Also as an option, the at least one microprogram stored in the register comprises instruction lines for arithmetic and/or logical calculation aimed at carrying out a matrix transposition between the data to be processed, as received by the input buffer, and the same data to be processed, as reorganized and written to the shared local memory.

Also as an option, at least two operating modes of the at least one microprogram stored in the register are configurable:
a first restart mode in which each execution of the at least one microprogram on a packet of data to be processed starts in a new execution context, and
a second pause mode in which each execution of the at least one microprogram on a packet of data to be processed starts in an execution context of the preceding packet of data to be processed in the order of receipt of the packets by the input buffer.

Also as an option, two write modes of the write control module can be configured by an identifier included in a header of each packet of data to be processed:
a first sequential write mode in which the data to be processed of each packet Indicating this first mode are written to the shared local memory on the basis of a relative address defined as being contiguous to the last address to which was written a piece of data to be processed from the previous packet of data to be processed, in the order of receipt of the packets by the input buffer, and
a second absolute-offset write mode in which the data to be processed of each packet indicating this second mode are written to the shared local memory on the basis of a relative address defined by an offset, also indicated in a header of this packet, to a predetermined reference address of the shared local memory.

Also proposed is a network-on-chip data processing device comprising:
a network for interconnecting computing nodes for the exchange of data packets between them or with at least one peripheral, and
a plurality of computing nodes, each node comprising:
a data packet input/output interface,
a shared local memory,
a direct memory access controller according to the invention as described above, for direct write access in the shared local memory for writing data extracted from packets received by its input buffer, and
at least one data processor other than the direct memory access controller, for processing of the data written by the direct memory access controller to the shared local memory.

Also proposed is a method for receiving and storing data by a computing node of a network-on-chip data processing device, comprising the following steps:
receiving packets of data to be processed via an input/output interface of the computing node by an input buffer of a direct memory access controller of the computing node,
extraction of the data to be processed from each packet by the direct memory access controller,
writing of the received and extracted data to be processed in a local memory of the computing node, by the direct memory access controller, the local memory being shared by at least one processor for processing the data other than the direct memory access controller,
furthermore comprising the following steps
execution by an arithmetic logic unit of the direct memory access controller of at least one microprogram consisting of instruction lines for arithmetic and/or logical calculation concerning only storage addresses for storing the received and extracted data to be processed for a reorganization of same in the shared local memory, and
writing of the received and extracted data in the shared local memory to addresses obtained by the reorganization.

BRIEF DESCRIPTION OF THE DRAWINGS

The invention will be better understood through the following description provided solely as an example and given in reference to the appended drawings, in which.

DESCRIPTION OF THE PREFERRED EMBODIMENTS

Figure 1A:
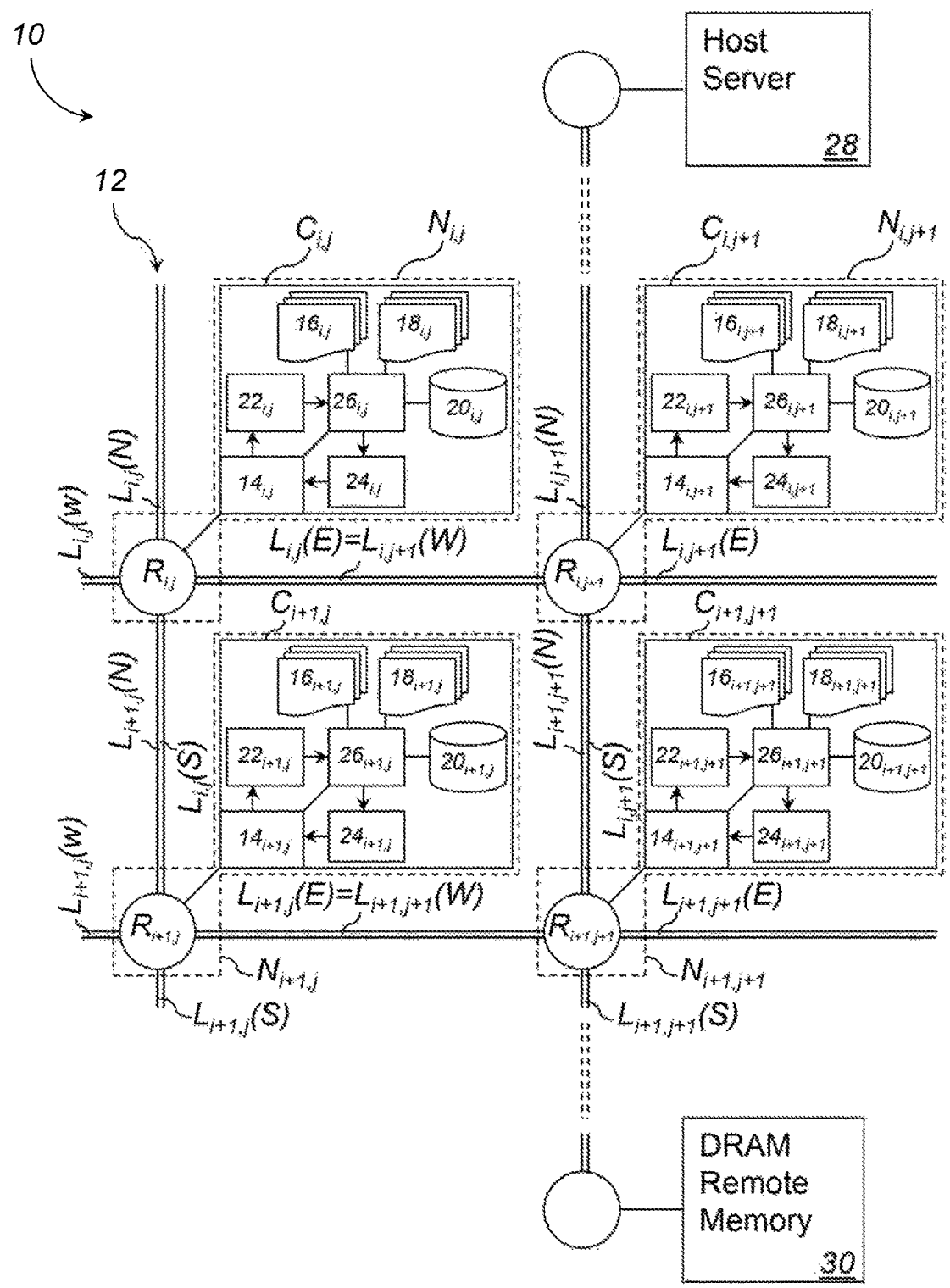
FIG. 1A is a schematic diagram of the general structure of a network-on-chip data processing device according to one embodiment of the invention.

Data processing device 10 shown in FIG. 1A comprises a network on a chip, partially shown. This network on a chip, made in the form of an integrated circuit, consists of a plurality of nodes arranged in a matrix and interconnected with each other by bidirectional links oriented in four different matrix directions, North (N), South (S), West (W), and East (E). The links allow data packets to be transmitted from one node to another and form an interconnection network 12.

In the example of FIG. 1A, only four nodes are shown without any limiting intent, indicated as $N_{i,j}$, $N_{i,j+1}$, $N_{i+1,j}$, and $N_{i+1,j+1}$. Four bidirectional links $L_{i,j}(N)$, $L_{i,j}(S)$, $L_{i,j}(W)$, and $L_{i,j}(E)$ go from node $N_{i,j}$ in the four directions mentioned above. Four bidirectional links $L_{i,j+1}(N)$, $L_{i,j+1}(S)$, $L_{i,j+1}(W)$, and $L_{i,j+1}(E)$ go from node $N_{i,j+1}$ in the four directions mentioned above. Four bidirectional links $L_{i+1,j}(N)$, $L_{i+1,j}(S)$, $L_{i+1,j}(W)$, and $L_{i+1,j}(E)$ go from node $N_{i+1,j}$ in the four directions mentioned above. Lastly, four bidirectional links $L_{i+1,j+1}(N)$, $L_{i+1,j+1}(S)$, $L_{i+1,j+1}(W)$, and $L_{i+1,j+1}(E)$ go from node $N_{i+1,j+1}$ in the four directions mentioned above. Note that the bidirectional link $L_{i,j}(E)$ corresponds to the bidirectional link $L_{i,j+1}(W)$, that the bidirectional link $L_{i+1,j}(E)$ corresponds to the bidirectional link $L_{i+1,j+1}(W)$, that the bidirectional link $L_{i,j}(S)$ corresponds to the bidirectional link $L_{i+1,j}(N)$, and that the bidirectional link $L_{i,j+1}(S)$ corresponds to the bidirectional link $L_{i+1,j+1}(N)$.

Figure 1B:
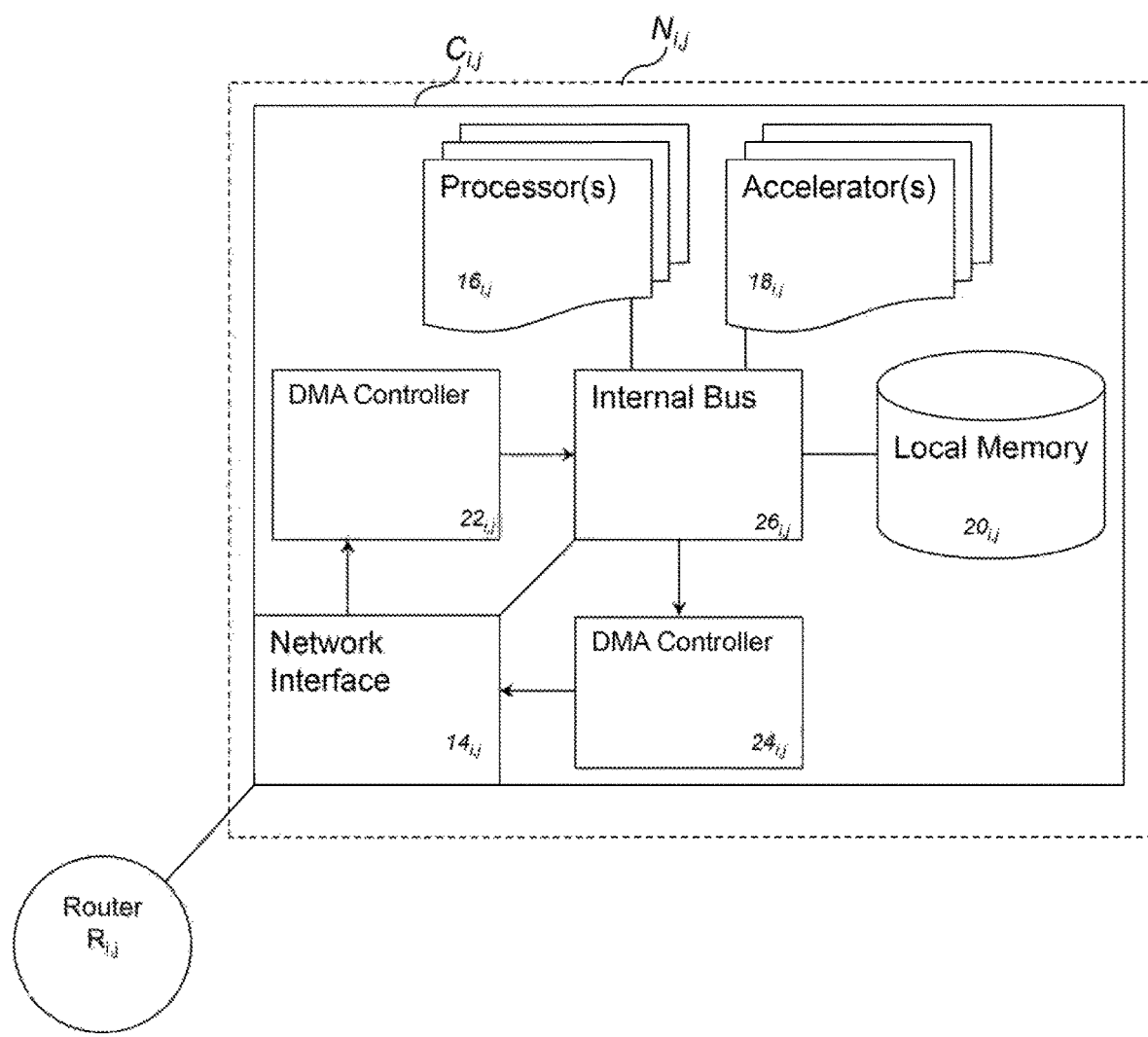
FIG. 1B is a schematic Illustration of one of the nodes of FIG. 1A and the node's corresponding router.

Node $N_{i,j}$ more specifically comprises a computing node $C_{i,j}$ and a router $R_{i,j}$. The function of router $R_{i,j}$ is to direct each data packet that it receives from computing node $C_{i,j}$ or from one of the aforementioned four directions to one of the aforementioned four directions or to computing node $C_{i,j}$. By well-known means, computing node $C_{i,j}$ comprises a network interface $14_{i,j}$ for the input/output of data packets, capable of communicating with router $R_{i,j}$. It also includes, for example, a set of microprogrammable processors $16_{i,j}$ and a set of dedicated accelerators $18_{i,j}$ for processing data contained in the packets received via network interface $14_{i,j}$. It also includes a local memory $20_{i,j}$ shared by processors $16_{i,j}$ and accelerators $18_{i,j}$ for carrying out their processing. The data to be processed, contained in the packets received via network interface $14_{i,j}$ are intended to be stored therein. This shared local memory $20_{i,j}$ is shown in the form of a single storage resource in FIG. 1A, but it could comprise a plurality of different memories, all shared locally. More generally speaking, it encompasses any notion of local address space which is read- and write-accessible by processors $16_{i,j}$ and accelerators $18_{i,j}$. An expanded view of the internals of node $N_{i,j}$ is shown in FIG. 1B.

Computing node $C_{i,j}$ also comprises a direct memory access controller or DMA controller which is functionally split in two in FIG. 1A, but it can concretely be implemented in the form of a processor dedicated to data transfers between shared local memory $20_{i,j}$ of computing node $C_{i,j}$ and the rest of the network: a DMA controller for receiving data to be processed by processors $16_{i,j}$ and accelerators $18_{i,j}$, identified as item $22_{i,j}$, and a DMA controller for transmitting data processed by processors $16_{i,j}$ and accelerators $18_{i,j}$, identified as item $24_{i,j}$. Receiving DMA controller $22_{i,j}$ is designed and microprogrammed to receive data to be processed coming from network interface $14_{i,j}$ and to write the data to a dedicated address space of shared local memory $20_{i,j}$. Transmitting DMA controller $24_{i,j}$ is designed and microprogrammed to read processed data placed in shared local memory $20_{i,j}$ by means of processors $16_{i,j}$ and accelerators $18_{i,j}$, and to direct them to another computing node of processing device 10 or to a peripheral via network interface $14_{i,j}$.

All the aforementioned functional elements, $14_{i,j}$, $16_{i,j}$, $18_{i,j}$, $20_{i,j}$, $22_{i,j}$, and $24_{i,j}$, of computing node $C_{i,j}$ are connected to an internal data transmission bus $26_{i,j}$ by which they can communicate with each other, particularly in order to facilitate and accelerate local memory access.

Just like node $N_{i,j}$, node $N_{i,j+1}$ comprises a computing node $C_{i,j+1}$ and a router $R_{i,j+1}$, computing node $C_{i,j+1}$ comprising a network interface $14_{i,j+1}$, a set of microprogrammable processors $16_{i,j+1}$, a set of dedicated accelerators $18_{i,j+1}$, a shared local memory $20_{i,j+1}$, a DMA controller $22_{i,j+1}$ for receiving data to be processed, a DMA controller $24_{i,j+1}$ for transmitting processed and an internal bus $26_{i,j+1}$. Likewise, node $N_{i+1,j}$ comprises a computing node $C_{i+1,j}$ and a router $R_{i+1,j}$, computing node $C_{i+1,j}$ comprising a network interface $14_{i+1,j}$, a set of microprogrammable processors $16_{i+1,j}$, a set of dedicated accelerators $18_{i+1,j}$, a shared local memory $20_{i+1,j}$, a DMA controller $22_{i+1,j}$ for receiving data to be processed, a DMA controller $24_{i+1,j}$ for transmitting processed data and an internal bus $26_{i+1,j}$. Likewise, node $N_{i+1,j+1}$ comprises a computing node $C_{i+1,j+1}$ and a router $R_{i+1,j+1}$, computing node $C_{i+1,j+1}$ comprising a network interface $14_{i+1,j+1}$, a set of microprogrammable processors $16_{i+1,j+1}$, a set of dedicated accelerators $18_{i+1,j+1}$, a shared local memory $20_{i+1,j+1}$, a DMA controller $22_{i+1,j+1}$ for receiving data to be processed, a DMA controller $24_{i+1,j+1}$ for transmitting processed data and an internal bus $26_{i+1,j+1}$.

Processing device 10 also comprises one or more peripherals connected to one or more nodes of the network on chip. Two are shown in FIG. 1A; for example, a host server 28 and a DRAM (Dynamic Random Access Memory) remote memory 30 associated, for example, with the host server 28.

Figure 2:
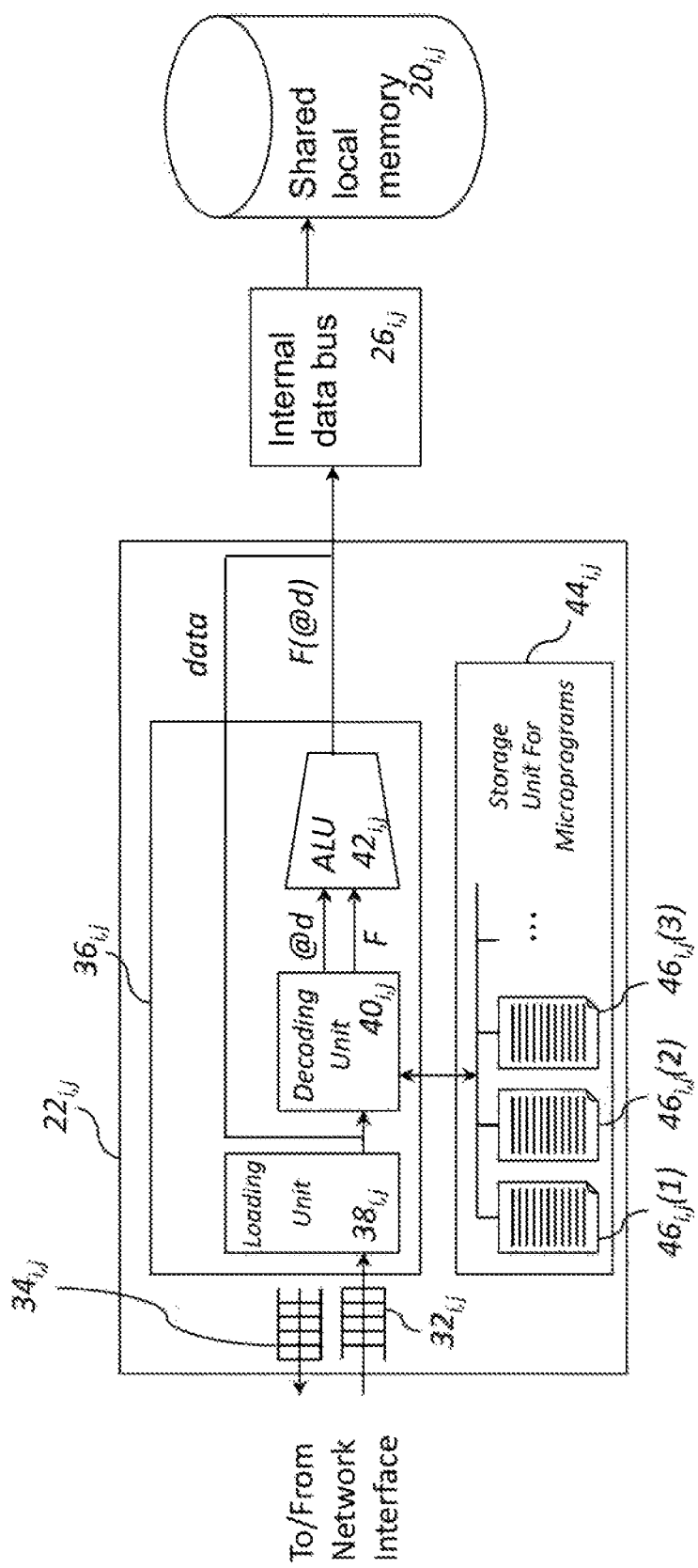
FIG. 2 is a schematic diagram of the general structure of a direct memory access controller of the processing device of FIG. 1A, according to one embodiment of the invention.

The general architecture of receiving DMA controller $22_{i,j}$ of computing node $C_{i,j}$ will now be described in detail in reference to FIG. 2. This architecture applies to all the other receiving DMA controllers of the other computing nodes of processing device 10.

Receiving DMA controller 22 firstly comprises an input buffer $32_{i,j}$ for receiving packets from router $R_{i,j}$ over network Interface $14_{i,j}$. Its primary function is to write the data to be processed, contained in the packets it receives, to dedicated address spaces of shared local memory $20_{i,j}$. In an advantageous way, this input buffer $32_{i,j}$ is as small as possible, which does not facilitate management of incoming fluctuations. However, the latency between this buffer memory and shared local memory $20_{i,j}$ is also a critical parameter that is important to limit. Consequently, in practice it is appropriate to anticipate changes in context between received packets to avoid lost clock cycles, while still opting for an effective and memory-efficient construction.

Receiving DMA controller $22_{i,j}$ also comprises an output buffer $34_{i,j}$ for sending various pieces of information complying with implemented communication or read/write protocols and resulting from its write operations in shared local memory $20_{i,j}$, to the network on chip from router $R_{i,j}$ via network interface $14_{i,j}$.

It also includes a module $36_{i,j}$ for managing writing to shared local memory $20_{i,j}$. More specifically, the function of this module $36_{i,j}$ is to extract the data to be processed from each packet received sequentially by input buffer $32_{i,j}$ and to direct them to a corresponding address space in shared local memory $20_{i,j}$ for their subsequent processing by at least one of microprogrammable processors $16_{i,j}$ and accelerators $18_{i,j}$. According to a non-limiting embodiment as illustrated in FIG. 2, it is configured as a three-cycle pipeline and, to that end, has three successive electronic units. A first loading unit 38 serves the function of extracting the data to be processed from each packet, generally referred to as "data" in FIG. 2, and of also extracting a certain number of execution parameters of a microprogram to be selected for each packet A second decoding unit $40_{i,j}$ serves the function of retrieving the execution parameters coming from loading unit $38_{i,j}$ as well as memory addresses @d of the data to be processed ("data"), and of creating an instruction thread for each packet, each instruction thread being defined from a microprogram to be selected by decoding unit $40_{i,j}$ in order to perform arithmetic and/or logical reorganization calculations F involving only the memory addresses @d of the data to be processed ("data"), for a reorganization of the data in shared local memory $20_{i,j}$. Each instruction thread possesses and manages its own write pointers and has the ability to proceed with memory jumps by means of simple arithmetic and logical functions, such as loops or "goto" instructions, address additions or subtractions, etc., for example. Lastly, a third arithmetic logic unit $42_{i,j}$ serves the function of executing the instruction thread created by decoding unit $40_{i,j}$ in order to perform the arithmetic and/or logical reorganization calculations F on the addresses @d and to thus obtain new reorganized addresses F(@d) for writing the data "data" to shared local memory $20_{i,j}$.

Receiving DMA controller $22_{i,j}$ further comprises a storage register $44_{i,j}$ for storing at least one microprogram. Several microprograms $46_{i,j}(1)$, $46_{i,j}(2)$, $46_{i,j}(3)$, ... are thus stored in the register and respectively associated with several corresponding identifiers making it possible to distinguish them from each other.

Figure 3:
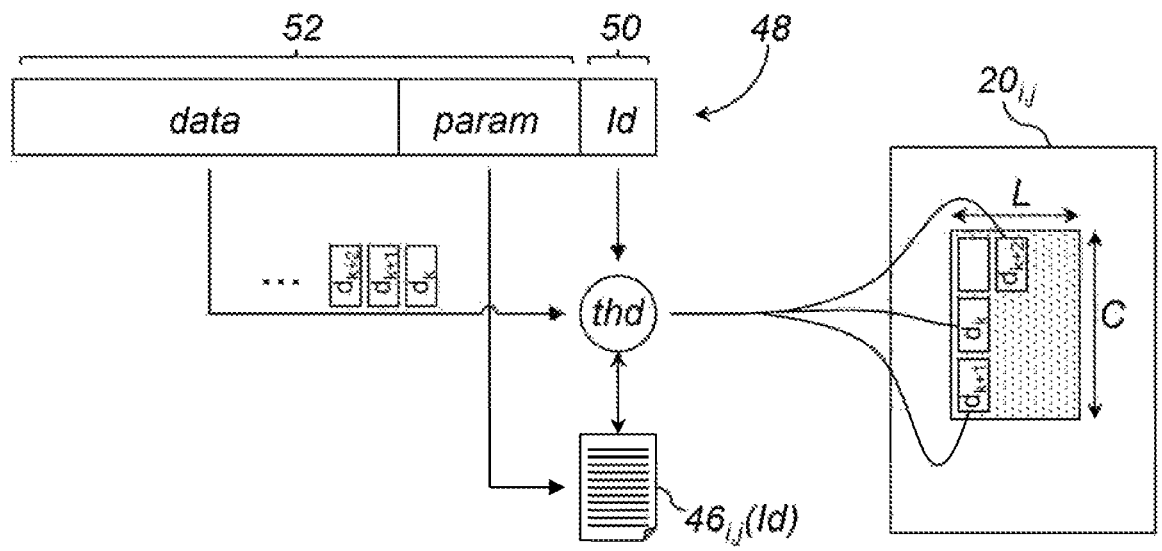
FIG. 3 shows a configuration example of a packet of data to be processed, which may be received and transmitted, to a shared local memory, by the direct memory access controller of FIG. 2.

As shown in FIG. 3, a data packet 48 received by input buffer $32_{i,j}$ of receiving DMA controller $22_{i,j}$ (shown in FIG. 2) comprises a primary header 50 and a payload 52 on the "transport" protocol level of the OSI model. When several microprograms potentially executable by receiving DMA controller $22_{i,j}$ are stored in the register, primary header 50 comprises an identifier "Id" allowing write control module $36_{i,j}$ to select one of those microprograms $46_{i,j}(1)$, $46_{i,j}(2)$, $46_{i,j}(3)$, .... Identifier "Id" is, for example, the address where the corresponding microprogram can be found in register $44_{i,j}$. This microprogram is identified as $46_{i,j}(\text{Id})$. Payload 52 may optionally comprise, in addition to the data to be processed (referred to as "data"), a secondary header including "param" data serving the function of setting the parameters of selected microprogram $46_{i,j}(\text{Id})$ or of the execution thereof. For instance, as an example, selected microprogram $46_{i,j}(\text{Id})$ may include execution parameters remaining to be defined, the parameters then being defined by values Indicated in the secondary header of packet 48. Write control module $36_{i,j}$ is configured to allocate these values to the corresponding parameters of selected microprogram $46_{i,j}(\text{Id})$ when decoding unit $40_{i,j}$ thereof creates instruction thread "thd" intended to execute this microprogram on the destination addresses of the data to be processed ("data"). In particular, when the data to be processed ("data") are image data, such as values of pixels, and the execution parameters to be defined are image processing parameters concerning a pixel reorganization, they may include sizes (L, C) of lines or columns of image blocks, or numbers of successive pieces of data to be processed that are to be written to successive addresses in shared local memory $20_{i,j}$, or address increments/decrements. In this case as well, as shown, for example, in FIG. 3 with some data to be processed referred to as $d_k$, $d_{k+1}$, and $d_{k+2}$, the instruction lines of arithmetic and/or logical calculation of selected microprogram $46_{i,j}(\text{Id})$ may be aimed at performing a matrix transposition between the data to be processed as received by input buffer $32_{i,j}$ and the same data to be processed, as reorganized and written to shared local memory $20_{i,j}$. This is particularly useful in wavelet image compression for performing the successively horizontal and vertical filtering.

As an option, selected microprogram $46_{i,j}(\text{Id})$ may function according to at least two different configurable modes:
a first restart mode in which each execution by instruction thread "thd" of the microprogram on a packet of data to be processed starts with a new execution context, and
a second pause mode in which each execution by instruction thread "thd" of the microprogram on a packet of data to be processed starts with an execution context of the preceding data packet to be processed in the order of receipt of the packets by input buffer $32_{i,j}$.

A corresponding operating mode parameter may be defined in packet 48, in primary header 50 or in the secondary header. This parameter may also be directly accessible in register $44_{i,j}$, for example via an MMIO (Memory-Mapped I/O) interface, by a user, by microprogrammable processors $16_{i,j}$ or by accelerators $18_{i,j}$.

Also as an option, write control module $36_{i,j}$ may function according to at least two different write modes:
a first sequential write mode in which the data to be processed ("data") of each packet to which this first mode applies are written to shared local memory $20_{i,j}$ from a relative address defined as being contiguous to the last address where a piece of data to be processed from the previous packet of data to be processed has been written in the order of receipt of the packets by input buffer $36_{i,j}$, and
a second absolute-offset write mode in which the data to be processed ("data") of each packet to which this second mode applies are written in shared local memory $20_{i,j}$ from a relative address defined by an offset, indicated in a (primary or secondary) header of this packet, to a predetermined reference address of shared local memory $20_{i,j}$.

A corresponding write mode parameter may be defined in packet 48, in primary header 50 or in the secondary header. This parameter may also be directly accessible in register $44_{i,j}$ by a user, by microprogrammable processors $16_{i,j}$, or by accelerators $18_{i,j}$.

Note that nothing prevents write control module 36 from processing a plurality of data packets at a time, particularly thanks to its pipeline architecture. In this case, it is designed advantageously to control the execution of several microprograms in parallel on several different virtual execution channels, each identified by a channel identifier included in each packet of data to be processed (in the primary header, for example). Indeed, it is sufficient to create a plurality of instruction threads "thd" in parallel, each of which being associated with an execution channel. An input buffer $32_{i,j}$ and an output buffer $34_{i,j}$ may also be associated with each execution channel. Likewise, each execution channel is associated with a local address space that is specifically dedicated to it in shared local memory $20_{i,j}$.

Note also that each microprogram is actuality a parametric software kernel which can be triggered upon receipt of each packet and completed at the time of its execution by an instruction thread by means of parameters supplied in each packet. It can be precompiled and stored in the form of binary code in register $44_{i,j}$. Advantageously, it is implemented in the form of an API (Application Programming Interface) to avoid any risk of inconsistency between microprograms and configurations at the time of their execution.

In accordance with the architecture described in detail above, in reference to FIGS. 1 to 3, a method of data reception and storage by any computing node $C_{i,j}$ of data processing device 10 with network on a chip 12 will now be described with respect to FIG. 4.

Figure 4:
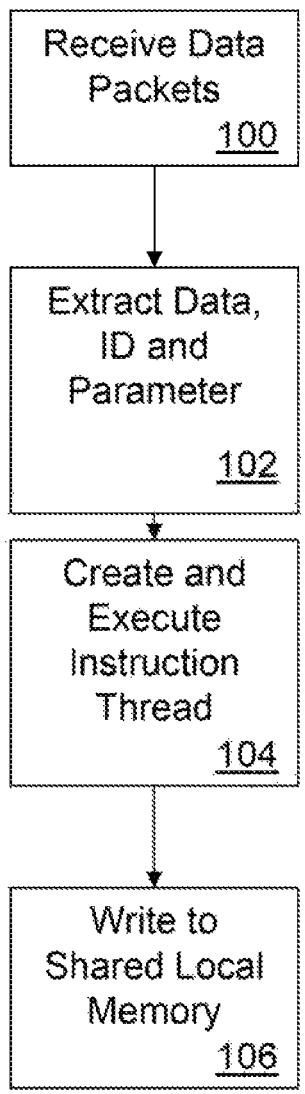
FIG. 4 shows the series of steps of a method for receiving and storing data to be processed by any one of the computing nodes of the device in FIG. 1A.

In FIG. 4, in a first step 100, data packets concerning a given execution channel are received via network interface $14_{i,j}$ of computing node $C_{i,j}$ by input buffer $32_{i,j}$ dedicated to this execution channel. As mentioned above, a plurality of input buffers dedicated respectively to a plurality of execution channels may be provided in receiving DMA controller $22_{i,j}$.

During a next step 102, the data to be processed "data" are extracted from each received packet by first loading unit $38_{i,j}$, along with the "Id" and "param" parameters for selecting the microprogram corresponding to the execution channel in question, for completely setting the parameters and operation thereof, and the desired execution or write mode.

During a next step 104, an instruction thread "thd" is created by decoding unit $40_{i,j}$ based on the "Id" and "param" parameters, and is executed by arithmetic logic unit $42_{i,j}$ for reorganization calculation F of the destination addresses @d of the data to be processed ("data") in shared local memory $20_{i,j}$. As indicated earlier, the instruction lines of the selected microprogram concern only arithmetic and/or logical calculations in which the operands are memory addresses of these data ("data") in shared local memory $20_{i,j}$. The reorganization of the data to be processed ("data") is therefore done on the fly without duplication of these data in any address space of receiving DMA controller $22_{i,j}$ or to which it has access.

Lastly, in final step 106, created instruction thread "thd" writes the data to be processed "data" to the reorganized addresses F(@d) in a dedicated local address space of shared local memory $20_{i,j}$.

In light of the pipeline architecture of write control module $36_{i,j}$, steps 100 to 106 are actually executed continuously in an interlaced manner.

Also note that these steps can be executed by software execution of one or more computer programs comprising instructions defined for this purpose, with receiving DMA controller $22_{i,j}$ being able to be comprised of a "computer" such as a programmable microprocessor. The functions performed by these programs could also be at least in part microprogrammed or micro-hardwired in dedicated integrated circuits. For instance, as a variant, the computing device implementing receiving DMA controller $22_{i,j}$ could be replaced with an electronic device consisting solely of digital circuits (without a computer program) for completing the same actions.

It is clear that a device such as the one described earlier allows for an effective reorganization of data transmitted by DMA controllers between computing nodes of a network on a chip, upon receipt of these data by the computing nodes that are supposed to process them, and without increasing local storage needs. In image compression processing applications Involving, for example, DCT (Discrete Cosine Transform) processing or wavelet processing, the savings in data processor computing time and storage space are very substantial and large thanks to implementation of the general principles of the present invention. In particular, the invention has particularly promising applications in distributed compute core devices operating at low computing frequency with low energy consumption, which is characteristic of the IoT (Internet of Things) audio and video field of application: energy consumption between 100 milliwatts (mW) and a few Watts, on-chip memory of less than 1 megabyte (MB), optional external memory between 256 kilobyte (kB) and 1 megabyte (MB), small integrated circuit. Of these applications, let us mention computer vision, voice recognition, digital photography, face detection or recognition, etc.

In addition, it should be noted that the invention is not limited to the embodiment described above. Indeed, a person skilled in the art could conceive of various modifications to the invention in light of the teachings disclosed above. In the claims which follow, the terms should not be interpreted as limiting the claims to the embodiment presented in the present description, but rather should be Interpreted as including all equivalent measures that the claims are intended to cover, in light of their wording, and which can be foreseen by a person skilled in the art through the application of his/her general knowledge to the implementation of the teaching disclosed above.

The invention claimed is:

1. A direct memory access controller configured to be used in a computing node of a system on chip, comprising:
   an input buffer for receiving packets of data to be processed, coming from an input/output interface of the computing node,
   a write control module for controlling writing, from each of the packets of data to be processed, data to be processed in a shared local memory of the computing node, the shared local memory being shared by at least one processor other than the direct memory access controller, the write control module including an arithmetic logic unit for executing microprograms, and
   a storage register for storing at least one microprogram,
   wherein said at least one microprogram, stored in the storage register, includes instructions for arithmetic and/or logical calculations concerning only storage addresses for storing the data to be processed for a reorganization of the data to be processed,
   wherein the write control module is configured to control execution of said at least one microprogram by the arithmetic logic unit, and
   wherein the at least one processor processes the data to be processed.

2. The direct memory access controller as claimed in claim 1, wherein:
   several microprograms are stored in the storage register and respectively associated with corresponding identifiers,
   the write control module is configured to select one of the several microprograms for each of the packets of data to be processed based on a correspondence between the identifier associated with the microprogram and an identifier included in a header of each of the packets of data to be processed.

3. The direct memory access controller as claimed in claim 1, wherein:
   said at least one microprogram stored in the storage register comprises execution parameters to be defined, the write control module is configured to define at least a portion of the execution parameters based on execution data included in a header of each of the packets of data to be processed.

4. The direct memory access controller as claimed in claim 3, wherein the execution parameters to be defined comprise image processing parameters including
sizes of lines of image blocks.

5. The direct memory access controller as claimed in claim 1, wherein the write control module is configured to control the execution of several microprograms in parallel on several different execution channels, each of which is identified by a channel identifier included in each of the packets of data to be processed, and to reserve several address sub-spaces associated with the execution channels, respectively, in the shared local memory.

6. The direct memory access controller as claimed in claim 1, wherein said at least one microprogram stored in the storage register comprises instruction lines for arithmetic and/or logical calculation for performing a matrix transposition between the data to be processed as received by the input buffer and the same data to be processed, as reorganized and written to the shared local memory.

7. The direct memory access controller as claimed in claim 1, wherein at least two operating modes of said at least one microprogram stored in the storage register are configurable;
    a first restart mode in which each execution of said at least one microprogram on a packet of data to be processed starts in a new execution context, and
    a second pause mode in which each execution of said at least one microprogram on a packet of data to be processed starts in an execution context of the preceding packet of data to be processed in the order of receipt of the packets by the input buffer.

8. The direct memory access controller as claimed in claim 1, wherein two write modes of the write control module are configurable by an identifier included in a header of each of the packets of data to be processed:
    a first sequential write mode of the two write modes being a mode that indicates the data to be processed of each packet to be processed is written to the shared local memory based on a relative address defined as being contiguous to a last address to which was written a piece of the data to be processed from a previous packet of the packets of data to be processed, in an order of receipt by the input buffer, and
    a second absolute-offset write mode of the two write modes being a mode that indicates the data to be processed of each packet to be processed is written to the shared local memory based on a relative address defined by an offset to a predetermined reference address of the shared local memory.

9. The direct memory access controller as claimed in claim 3, wherein the execution parameters to be defined comprise image processing parameters including sizes of columns of image blocks.

10. The direct memory access controller as claimed in claim 3, wherein the execution parameters to be defined comprise image processing parameters including numbers of successive pieces of data to be processed which are to be written to successive addresses in the shared local memory.

11. The direct memory access controller as claimed in claim 1, wherein a sequential write mode of the write control module is configurable by an identifier included in a header of each of the packets of data to be processed, wherein the sequential write mode is a mode that indicates the data to be processed of each packet-to be processed is written to the shared local memory based on a relative address defined as being contiguous to a last address to which was written a piece of the data to be processed from a previous packet of the packets of data to be processed, in an order of receipt by the input buffer.

12. The direct memory access controller as claimed in claim 1, wherein an absolute-offset write mode is configurable by an identifier included in a header of each of the packets of data to be processed, wherein the absolute-offset write mode is a mode that indicates the data to be processed of each packet to be processed is written to the shared local memory based on a relative address defined by an offset to a predetermined reference address of the shared local memory.

13. A network-on-chip data processing device comprising:
    a network, and
    a plurality of computing nodes, interconnected by the network, for exchanging data packets between a first computing node of the plurality of computing nodes and at least one of (1) a second computing node of the plurality of computing nodes and at least one peripheral, each of the plurality of computing nodes comprising:
        a data packet input/output interface,
        a shared local memory,
        an input buffer;
        a direct memory access controller as claimed in claim 1, for direct write access in the shared local memory for writing data extracted from packets received by the input buffer of the computing node, and
        at least one data processor other than the direct memory access controller, for processing the data written by the direct memory access controller to the shared local memory.

14. A method for receiving and storing data by a computing node of a network-on-chip data processing device, comprising:
    receiving, by an input buffer of a direct memory access controller of the computing node via an input/output interface of the computing node, packets of data to be processed,
    extracting the data to be processed from each of the packets of data to be processed by the direct memory access controller,
    writing the extracted data to be processed in a shared local memory of the computing node by the direct memory access controller, the shared local memory being shared by at least one processor other than the direct memory access controller,
    executing by an arithmetic logic unit of the direct memory access controller, at least one microprogram including instructions for arithmetic and/or logical calculations concerning only storage addresses for storing the extracted data to be processed for a reorganization of the data to be processed,
    writing the extracted data in the shared local memory to addresses obtained by said reorganization, and
    processing the reorganized data using the at least one processor.

* * * * *